United States Patent [19]
Aberson et al.

[11] Patent Number: 6,033,339
[45] Date of Patent: Mar. 7, 2000

[54] METHOD AND APPARATUS FOR CONTROLLING THE TRANSMISSION RATIO OF A BELT VARIATOR IN A TRANSMISSION UNIT FOR A MOTOR VEHICLE

[75] Inventors: Frederik Ernst Carel van derHardt Aberson, Richelle/Vise; Ronald Buckinx, Stevoort, both of Belgium

[73] Assignee: VCSI, naamloze vennootschap, Belgium

[21] Appl. No.: 08/979,555

[22] Filed: Nov. 26, 1997

[30] Foreign Application Priority Data

Dec. 10, 1996 [BE] Belgium ................................ 09601027

[51] Int. Cl.⁷ ........................................... F16H 61/00
[52] U.S. Cl. ................................................. 477/46; 477/48
[58] Field of Search ........................................ 477/45–48

[56] References Cited

U.S. PATENT DOCUMENTS

| | | | |
|---|---|---|---|
| 4,659,321 | 4/1987 | Miyawaki | 477/48 X |
| 4,671,140 | 6/1987 | Koshio | 477/46 |
| 5,609,544 | 3/1997 | Lardy et al. | 477/46 |
| 5,688,204 | 11/1997 | Runge et al. | 477/46 |
| 5,746,678 | 5/1998 | Roovers et al. | 477/46 X |
| 5,820,513 | 10/1998 | Greenwood | 477/46 X |
| 5,947,861 | 9/1999 | Nobumoto | 477/46 X |

FOREIGN PATENT DOCUMENTS

| | | |
|---|---|---|
| 0 676 564 A2 | 10/1995 | European Pat. Off. . |
| 0 681 119 A2 | 11/1995 | European Pat. Off. . |
| 0 697 548 A1 | 2/1996 | European Pat. Off. . |
| WO 90/04119 | 4/1990 | WIPO . |

*Primary Examiner*—Khoi Q. Ta
*Attorney, Agent, or Firm*—Bacon & Thomas PLLC

[57] ABSTRACT

A method for controlling the transmission ratio of a belt variator in a transmission unit for a motor vehicle is provided. The method at least provides for a control manner whereby the transmission ratio is controlled as a function of gear change signals given by a driver of the motor vehicle. The control is carried out according to what is called a variogram which is defined by a plurality of predetermined fixed control lines (A-B-C-D-E-F) via following the control lines. The control lines are determined so that, when gearing up and gearing down, respectively, large rotational speed differences in each successive transition between the control lines (A-B-C-D-E-F) are avoided.

26 Claims, 2 Drawing Sheets

METHOD AND APPARATUS FOR CONTROLLING THE TRANSMISSION RATIO OF A BELT VARIATOR IN A TRANSMISSION UNIT FOR A MOTOR VEHICLE

BACKGROUND OF THE INVENTION

1. Field of the Invention

The present invention concerns a method and an apparatus for controlling transmission ratio of a belt variator, in particular a belt variator in a transmission unit for a motor vehicle.

In particular, the invention concerns a method and an apparatus whereby the transmission ratio may be controlled according to two methods, namely a method whereby the transmission ratio is automatically altered as a function of different characteristics of speed and torque and such and a method whereby the transmission ratio is altered gradually as a result of signals given by the driver of the vehicle.

2. Description of the Related Art

With the second method, the transmission "shifts" in a manner similar to that of a conventional gearbox. It is desirable for certain applications that, instead of making use of the conventional automatic transmission, one may switch to the above-mentioned second method.

According to the second method, the signals for gearing up and gearing down, respectively, are given for example by briefly exerting a pressure on a gear lever in one direction to go into a higher gear and in the other direction to go into a lower gear.

Consequently, this method is sometimes called the "tip mode".

A known embodiment thereof is described in EP 0.697.548.

SUMMARY OF THE INVENTION

The invention aims towards a method and an apparatus for controlling the transmission ratio of a belt variator in a transmission unit for a motor vehicle whereby the handling in the "tip mode" is considerably more comfortable than is the case with all the devices known until now.

To this aim, the invention concerns a method for controlling the transmission ratio of a belt variator which at least provides for a control manner whereby the transmission ratio is controlled as a function of gear change signals given by the driver of the vehicle. The control is carried out according to what is called a variogram which is defined by a plurality of predetermined fixed control lines. The control is carried out via following the control lines. The control lines are selected so that, when gearing up and gearing down, respectively, large differences between the rotational speed differences in each successive transition between the control lines are avoided.

The fact that large rotational speed differences are excluded or are at least avoided to a large extent causes the transitions during the gearing up and gearing down, respectively, to involve rotational speed differences which are identical or more or less identical to one another for each change. This results in a very comfortable and predictable handling of the motor vehicle. A further result is that the rotational speed differences when changing between the lower gears no longer differ very much from those when changing between the higher gears, which also contributes to a more comfortable and predictable handling of the vehicle.

Preferably, the control lines are determined so that at least in a part of an operational field of the variogram, preferably the majority of the operational field, most of the above-mentioned rotational speed differences in each transition between the selected control lines are practically identical to one another (better still are entirely identical to one another) for one and the same vehicle speed or even for different vehicle speeds.

In order to optimize the method according to the invention, the control lines are preferably determined so that they comply with one or several additional criteria which will be explained in the following detailed description.

According to the most preferred embodiment, the control lines are determined to be parallel or almost parallel, preferably parallel to a first control line corresponding to an overdrive ratio, as well as to be separated by mutual distances which are equal or almost equal to one another.

The invention also concerns an apparatus for implementing the above-mentioned method, whose characteristics will become clear from the following detailed description.

BRIEF DESCRIPTION OF THE DRAWINGS

In order to better explain the characteristics of the invention, the following preferred embodiments are described as examples only without being limitative in any way, with reference to the accompanying drawings, in which.

DETAILED DESCRIPTION OF THE PREFERRED EMBODIMENTS

Figure 1:
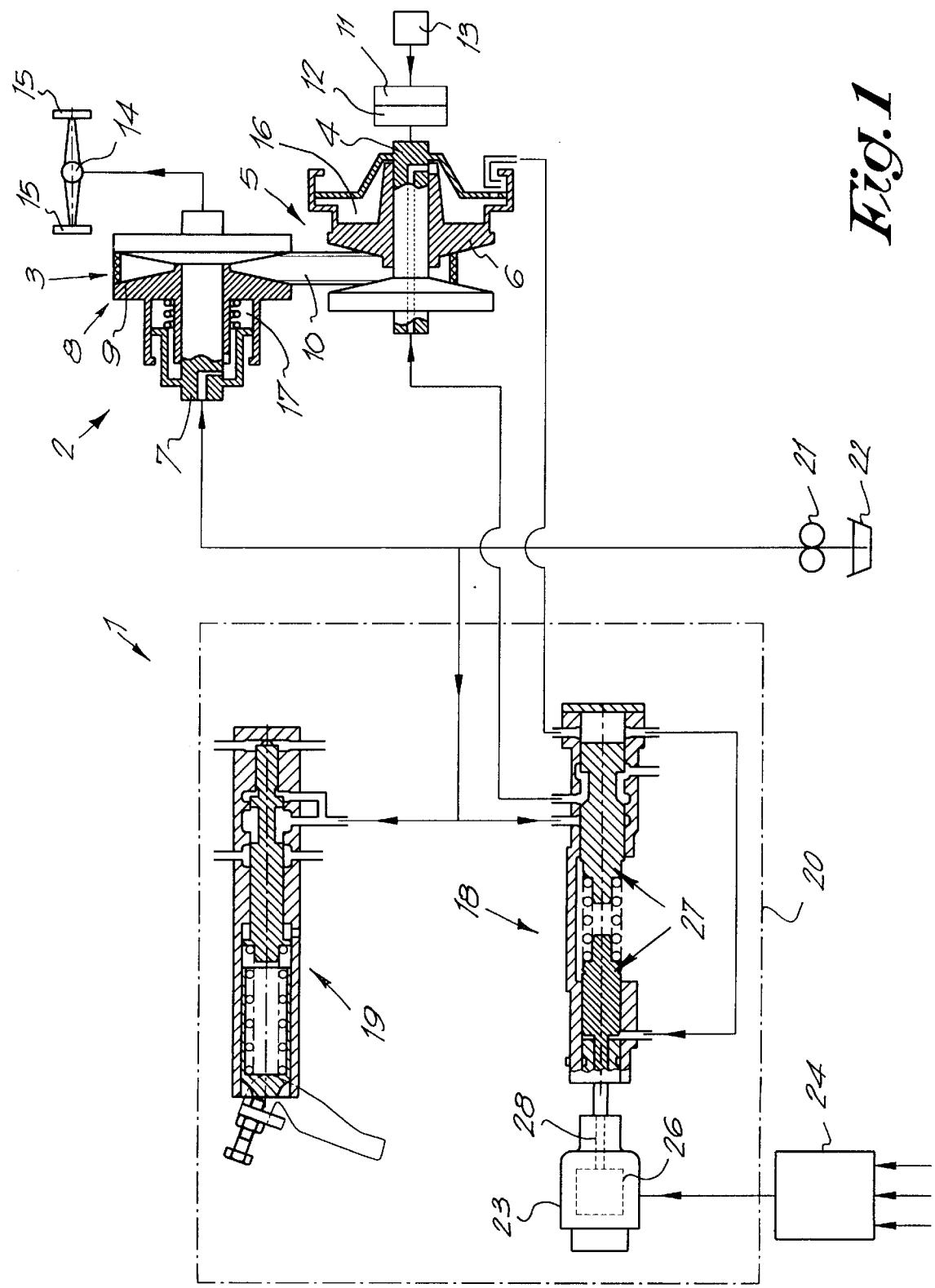
FIG. 1 schematically represents a continuously variable transmission which is equipped with an apparatus according to the invention.

FIG. 1 schematically shows an apparatus 1 for controlling a transmission unit 2 which is equipped with a belt variator 3.

Belt variator 3 comprises: a primary pulley 5 placed on an ingoing shaft 4 and having at least one pulley half 6 which may be axially moved; a secondary pulley 8 placed on a driven shaft 7 and having at least one pulley half 9 which may be axially moved; and an endless transmission element 10, such as a belt, provided between pulleys 5 and 8 so that the transmission ratio between shafts 4 and 7 may be altered by axially moving pulley halves 6 and 9.

Ingoing shaft 4 is usually driven by a drive-off coupling 11 and a reversing unit 12 driven by a motor 13 of the motor vehicle concerned. The movement of driven shaft 7 is transmitted onto a number of wheels 15 of the vehicle via a differential gear 14 or the like.

Pulley halves 6 and 9 are axially moved by hydraulic pressure cylinders working in conjunction therewith. The hydraulic pressure cylinders include a primary pressure cylinder 16 and a secondary pressure cylinder 17 whose pressures are regulated by a primary regulating valve 18 and a secondary regulating valve 19, respectively.

Regulating valves 18 and 19 are part of a hydraulic regulating unit 20 which is fed in a known manner by a hydraulic medium under pressure pumped up from a reservoir 22 by a pump 21.

The transmission ratio of belt variator 3 is mainly controlled by primary regulating valve 18 which is controlled in turn by a drive element 23 receiving signals from a control unit 24.

The behavior of the continuously variable transmission is, as explained in EP 0.697.548, according to what is called a variogram, i.e., a diagram in which the different operating conditions are represented as a function of the velocity V of the motor vehicle and the rotational speed n of motor 13 or ingoing shaft 4.

Figure 2:
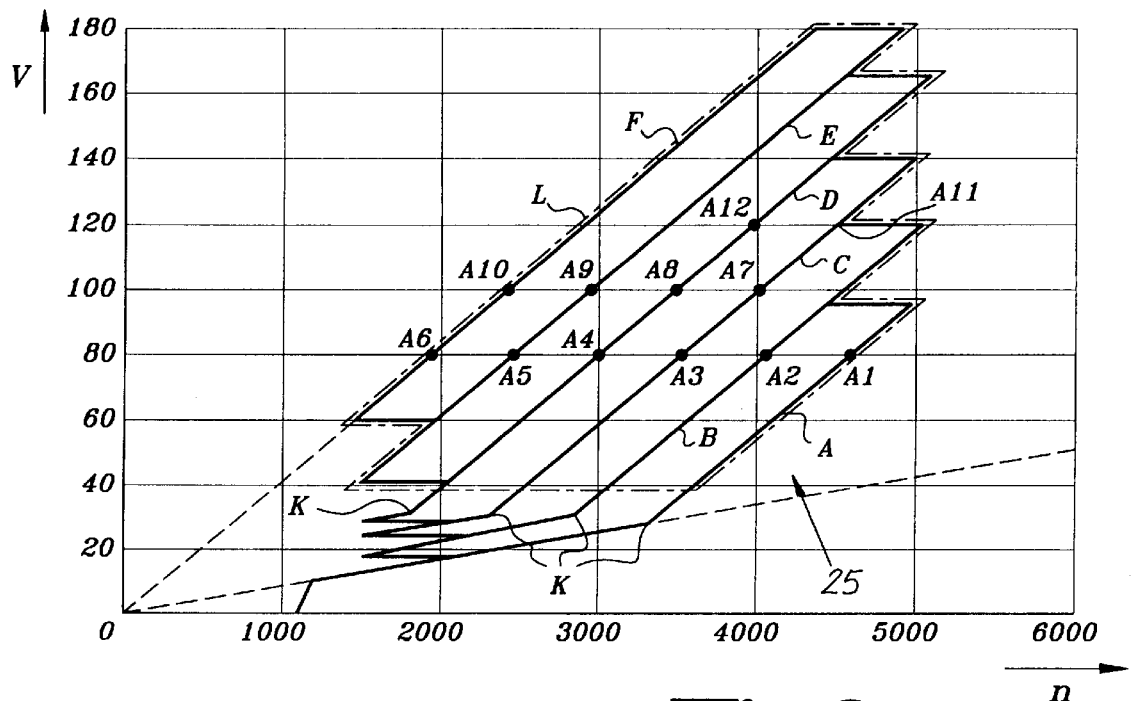
FIGS. 2 and 3 show variograms for two embodiments of the invention.

As is represented in the variogram of FIG. 2, when the above-mentioned "tip mode" is applied, only predetermined fixed control lines, in this case A-B-C-D-E-F, may be followed. One may only switch from one control line to the next in this case. Switching is done by emitting a signal, in particular what is called a "tip signal", for example by the gear lever of the vehicle. Consequently, although a continuously variable transmission is applied, a "shifting" behavior is obtained which in some respects resembles a stepped shifting behavior of a gearbox with fixed transmission ratios.

It should be noted that control lines A-B-C-D-E-F are determined so that a handling which is clearly and deliberately different from the handling of a transmission unit which is provided with gears with fixed transmission ratios is obtained.

The invention is unique in that, as represented in FIG. 2, control lines A-B-C-D-E-F are followed according to the variogram which are selected so that, when gearing up and gearing down, respectively, large differences between the rotational speed differences in each of a plurality of transitions between the control lines are prevented.

Preferably, control lines A-B-C-D-E-F are determined so that at least in a part of the operational field, the rotational speed differences are identical or practically identical to one another, even at different vehicle speeds.

In particular, the rotational speed differences for all the transitions are preferably identical to one another for the majority of the operational field.

This implies that the rotational speed differences at transitions between the successive control lines, in other words the horizontal distances between control lines A-B-C-D-E-F, are equal to one another or only differ from one another within certain limits.

This means that in the variogram as represented in FIG. 2, the distances A1–A2, A2–A3, A3–A4, A4–A5, A5–A6 differ little from one another or are preferably equal to one another. These distances preferably also differ little from or are equal to the distances related to other velocities, such as the distances A7–A8, A9–A10, A11–A12, etc.

It is clear that these criteria are preferably to be complied with in an ideal manner. Preferably the criteria which dictate that the rotational speed differences in each of the transitions must be identical to one another; but it is also clear that the ideal circumstances may be deviated from while still obtaining an advantageous effect. However, deviations between successive transitions preferably shall not exceed 10% at the same velocity. In the variogram of FIG. 2, this implies that the distance A2–A3 shall deviate no more than 10% from the distance A1–A2, that A3–A4 shall deviate no more than 10% from A2–A3, that A4–A5 shall deviate no more than 10% from A3–A4, etc. This also implies that the distance A8–A9 shall deviate no more than 10% from the distance A7–A8.

According to the most preferred embodiment, control lines A-B-C-D-E-F are determined so that, in the above-mentioned part of the operational field (better still in the entire operational field), the difference between the largest rotational speed difference and the smallest rotational speed difference is kept under 10% of the largest rotational speed difference. This means that in a variogram in which the number of revolutions are represented in a linear manner, there will be no horizontal distances between control lines A-B-C-D-E-F which deviate more than 10% from one another.

As is further represented in FIG. 2, the control according to the invention will preferably be carried out such that control lines A-B-C-D-E-F are followed which run parallel or almost parallel to one another for the majority of the operational field.

It is clear that control lines A-B-C-D-E-F are preferably exactly parallel to one another, but deviations are allowed while still remaining within the scope of the invention. However, these deviations are preferably restricted to deviations as far as parallelism is concerned which, in the case where control lines A-B-C-D-E-F diverge away from the original of the variogram in the above-mentioned part of the operational field, amount to 10% at the most, expressed as a change in the rotational speed per speed difference of 20 km/h. In the case where control lines A-B-C-D-E-F converge away from the origin, deviations may exceed 10%, as will become clear from the variogram described in FIG. 3.

The above implies that, for example in FIG. 2, in the case where certain control lines diverge in relation to one another as one goes further away from the origin, the distance A7–A8 may differ no more 10% from the distance A3–A4, the distance A11–A12 may differ no more than 10% from the distance A7–A8, etc.

It should be noted that, as represented in FIG. 2, the control is preferably carried out so that the operational field has a form whereby a right bottom angle 25, in particular the angle which is located in a region which is characterized by low vehicle speeds and high rotational speeds, is round or cut off. Thus, high rotational speeds at low vehicle speeds are excluded, positively influencing the handling of the vehicle and the noise.

Figure 3:
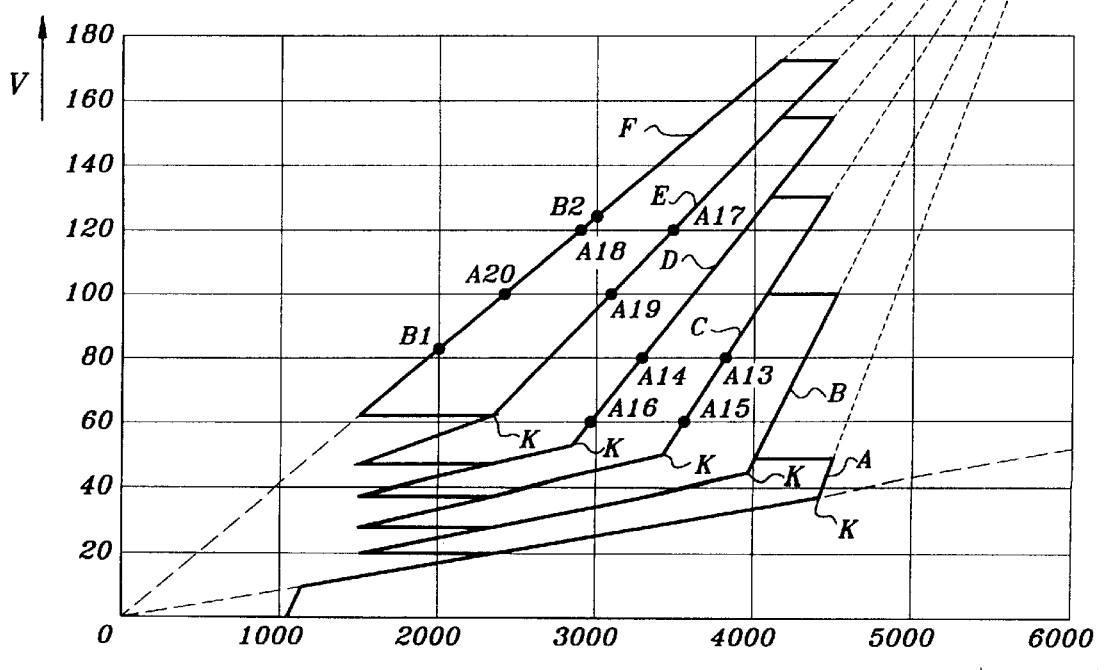

According to another preferred embodiment, represented in FIG. 3, control lines A-B-C-D-E-F are determined to converge towards the top, preferably into one point P. Thus, a more dynamic variant is obtained.

As the rotational speed steps are smaller in this case at high speeds than at low speeds, less decrease of engine power during gearing actions results, which contributes to the dynamic character.

The convergence or mutual approach between the control lines amounts to a maximum of 30% per speed difference of 20 km/h. This implies that, for example, the rotational speed difference determined by the distance A13–A14 deviates 30% at the most from the rotational speed difference which is determined by the distance A15–A16, and, for example, that the distance A17–A18 deviates no more than 30% from the distance A19–A20.

As is represented in FIGS. 2 and 3, at least a number of the control lines in a central part of the variogram, in other words over the majority of their length, preferably run straight. In a lower part, breakpoints K or slight curves, either bendings or rounded breakpoints, from where the control lines are directed more or less to the origin of the variogram may occur such that the control lines have discontinuity in slope. Under breakpoints K, the control lines concerned preferably also run parallel or almost parallel to one another wherein the same deviations may be allowed for as mentioned above for the top parts of control lines A-B-C-D-E-F.

As is further represented in FIGS. 2 and 3, a first control line F, which coincides with what is called the "overdrive ratio", normally extends through the origin of the variogram.

It should be noted that the lines which are determined by the extreme ratios "Low" and "Overdrive", namely control lines A and F, form two of the four limits of the operational field. All the other control lines are preferably related to and derived from the "Overdrive ratio".

In the majority of the operational field, in particular the part of the operational field which is located above breakpoints K, the slope of the control lines is determined so that it exceeds 30 km/h per 1000 rev/min. This implies, for example, that in the variogram of FIG. 3, the slope of first control line F is such that the speed difference belonging to the points B1 and B2 is larger than 30 km/h, which in this case is about 40 km/h. Thus, the control lines in the majority of the operational field are prevented from running too flat and causing small deviations in the course of these control lines to result in large rotational speed differences. Further, the control is not made to be extremely sensitive.

The part of the variogram onto which the above-mentioned criteria at least apply preferably consists of the central part of the variogram, in other words the part where most of the driving and gearing is done.

Further, control lines A-B-C-D-E-F are preferably determined so that the part of the variogram in which these control lines comply with the above-mentioned criteria forms at least 75% of the entire operational field. The entire operational field means, in this context, the surface of the variogram which is located between control line A, control line F, the lower transitions between the different control lines and the top transitions between the different control lines.

According to a practical embodiment, the control lines are determined so that the above-mentioned part of the operational field, in other words the part in which the control lines comply with the above-mentioned characteristics, coincides at least with the part of the operational field which is situated above 60 km/h in the variogram, and better still with the part which is situated above 40 k/h, in other words the part which is outlined in FIG. 2 with the dot and dash line L.

It should be noted that while embodiments are represented in FIGS. 2 and 3 with six control lines, it is also possible to make embodiments with more or less than six control lines. An embodiment with six control lines is preferred, however, as the rotational speed differences in each transition may be kept relatively small. More than six control lines are less advantageous, however, as the driver will have to shift more.

It is clear that the invention also concerns an apparatus 1 for realizing the above-mentioned method. As represented in FIG. 1, use is made of a control unit 24 provided with the required control programs such that, when the "tip mode" is activated predetermined fixed, control lines will automatically be followed which comply with the above-described method.

According to the most preferred embodiment of apparatus 1, primary regulating valve 18 is controlled to this end by drive element 23 which is formed of an actuator. This actuator may, for example, comprise a stepping motor 26 which may axially move valve discs 27 of primary regulating valve 18 by a worm transmission 28. Such an actuator allows for a very precise control according to the predetermined control line.

Control unit 24 preferably ensures that, when extreme limit values are reached, which may occur when the driver does not give the change signal in time, there will be an automatic transition to a higher or lower control line.

It should be noted that the above-mentioned "transitions" means theoretical transitions at one and the same speed, in other words horizontal transitions in the above-mentioned variogram.

Finally, it should be noted that all the above-mentioned characteristics which are defined based on the form of the variogram apply to a variogram represented as a coordinate system with linear coordinates.

The present invention is by no means restricted to the embodiments described by way of example and represented in the drawings; on the contrary, such a method and apparatus for controlling a transmission ratio of a belt variator may be made according to several variants while still remaining within the scope of the invention.

What is claimed is:

1. An apparatus for controlling the transmission ratio of a belt variator in a transmission unit of a motor vehicle in a tip mode such that the transmission ratio is controlled as a function of gear change signals given by a driver of said motor vehicle via following a plurality of predetermined fixed control lines according to a variogram, comprising:

an electronic control unit;

a valve drive element controlled by said electronic control unit;

a hydraulic regulating unit including at least one regulating valve controlled by said valve drive element;

a primary pressure cylinder and a secondary pressure cylinder controlled by said regulating valve; and a belt variator including a primary pulley with a primary pulley half and a secondary pulley with a secondary pulley half, said pulley halves being axially movable, said axial movement controlled by said pressure cylinders, wherein said hydraulic regulating unit alters said transmission ratio of said belt variator and said electronic control unit ensures that said controlling of said transmission ratio is according to predetermined fixed control lines which are determined so that a rotational speed difference in each of a plurality of successive transitions between the control lines at a particular vehicle speed is substantially equal to the rotational speed difference in an immediately preceding transition when gearing up and gearing down.

2. An apparatus for controlling the transmission ratio of a belt variator according to claim 1, wherein said electronic control unit allows an alternative method for controlling said transmission ratio of said belt variator, said alternative method providing automatic controlling of said transmission ratio.

3. A method for controlling the transmission ratio of a belt variator in a transmission unit of a motor vehicle, comprising:

controlling the transmission ratio in a tip mode such that the transmission ratio is controlled as a function of gear change signals given by a driver of a motor vehicle via following a plurality of predetermined fixed control lines according to a variogram defining an operational field including engine speeds, vehicle speeds and an origin, the control lines being determined so that a rotational speed difference in each of a plurality of successive transitions between the control lines at a particular vehicle speed is substantially equal to the rotational speed difference in an immediately preceding transition when gearing up and gearing down.

4. The method according to claim 3, wherein the control lines are determined so that at least a number of the control lines are straight lines for a majority of their length.

5. The method according to claim 3, wherein a first control line corresponding to an overdrive ratio is determined to pass through the origin of the variogram.

6. The method according to claim 3, wherein the controlling of the transmission ratio is executed so that the operational field exclude high rotational speeds at low vehicle speeds by cutting off the angle formed by a horizontal axis of the variogram and a control line which is located in a region of low vehicle speeds and high rotational speeds.

7. The method according to claim 3, wherein the controlling of the transmission ratio is automatic for certain predetermined borderline cases so that an automatic transmission between successive control lines occurs.

8. The method according to claim 3, wherein at least one of the control lines is determined so that it has a discontinuity in slope at low vehicle speeds.

9. The method according to claim 8, wherein at least a number of the control lines are determined so that each has a discontinuity in slope and runs substantially parallel to each other at low vehicle speeds.

10. The method according to claim 3, wherein the control lines are determined so that the control lines run substantially parallel to one another for a majority of the operational field.

11. The method according to claim 10, wherein the control lines are determined so that the control lines run exactly parallel to one another for a majority of the operational field.

12. A method for controlling the transmission ratio of a belt variator in a transmission unit of a motor vehicle, comprising:

controlling the transmission ratio as a function of gear change signals given by a driver of a motor vehicle via following a plurality of predetermined fixed control lines according to a variogram defining an operational field including engine speeds, vehicle speeds and an origin, the control lines being determined so that a rotational speed difference in each of plurality of successive transitions between the control lines at a particular vehicle speed is substantially equal to the rotational speed difference in an immediately preceding transition when gearing up and gearing down;

wherein the control lines are determined so that the control lines run substantially parallel to one another for a majority of the operational field and so that for the majority of the operational field at least two of the control lines converge/diverge away from the origin of the variogram at a maximum of 10% expressed as a change in the rotational speed per 20 km/h vehicle speed difference.

13. The method according to claim 12, wherein the control lines are determined so that the control lines converge away from the origin of the variogram.

14. The method according to claim 13, wherein the control lines are determined so that the control lines converge at a maximum of 30% expressed as a change in the rotational speed per 20 km/h vehicle speed difference.

15. The method according to claim 13, wherein the control lines are determined so that the control lines converge into a single point.

16. The method according to claim 15, wherein the control lines are determined so that the control lines converge at a maximum of 30% expressed as a change in the rotational speed per 20 km/h vehicle speed difference.

17. The method according to claim 3, wherein the control lines are determined so that each of the rotational speed differences are practically identical to one another for most of the successive transitions in at least a part of the operational field, even at different speeds of the vehicle.

18. The method according to claim 17, wherein the control lines are determined so that each of the rotational speed differences are practically identical to one another for all of the transitions between all of the successive control lines in at least a part of the operational field.

19. The method according to claim 17, wherein the control lines are determined so that for the part of the operational field the control lines have a slope greater than 30 km/h per 1,000 rev/min.

20. The method according to claim 17, wherein the part of the operational field is a central part of the variogram.

21. The method according to claim 17, wherein the part of the operational field is at least 75% of the entire operational field.

22. The method according to claim 17, wherein the part of the operational field includes at least the operational field located above 40 km/h in the variogram.

23. The method according to claim 17, wherein the control lines are determined so that each rotational speed difference between successive control lines at the same speed of the vehicle deviates from another rotational speed difference between successive control lines by less than 10% for at least the part of the operational field.

24. The method according to claim 23, wherein the control lines are determined so that the rotational speed differences between successive control lines are identical.

25. The method according to claim 23, wherein the rotational speed difference between successive control lines which is largest differs from the rotational speed difference between successive control lines which is smallest by less than 10% for at least the part of the operational field.

26. The method according to claim 17, wherein the control lines are determined so that the rotational speed differences between successive control lines are identical.

* * * * *